United States Patent [19]

Jenkins et al.

[11] 4,029,257
[45] June 14, 1977

[54] THERMALLY ACTUATED VALVE

[75] Inventors: Patrick A. Jenkins; Ronald E. Reinke, both of Decatur, Ill.

[73] Assignee: Borg-Warner Corporation, Chicago, Ill.

[22] Filed: Oct. 8, 1975

[21] Appl. No.: 620,625

[52] U.S. Cl. .......................... 236/48 R; 236/101 C
[51] Int. Cl.² ................. F16K 31/56; G05D 23/10
[58] Field of Search ......... 236/101 R, 101 E, 48 R, 236/81, 101 C, 87; 123/117 A

[56] References Cited

UNITED STATES PATENTS

| | | |
|---|---|---|
| 3,450,342 | 6/1969 | Arledge, Jr. ........................ 236/1 |
| 3,542,289 | 11/1970 | Ojala et al. .................... 236/101 A |
| 3,704,697 | 12/1972 | Weymann ..................... 123/117 A |
| 3,729,132 | 4/1973 | Ludwig .......................... 236/87 X |
| 3,930,613 | 1/1976 | Place ............................ 236/101 X |

Primary Examiner—Irwin C. Cohen
Attorney, Agent, or Firm—Herman E. Smith

[57] ABSTRACT

A thermally actuated valve includes a snap action bimetal valving member enclosed in a cartridge which is inserted in a hollow fitting arranged for contact with a heated medium such as the coolant of an internal combustion engine.

6 Claims, 16 Drawing Figures

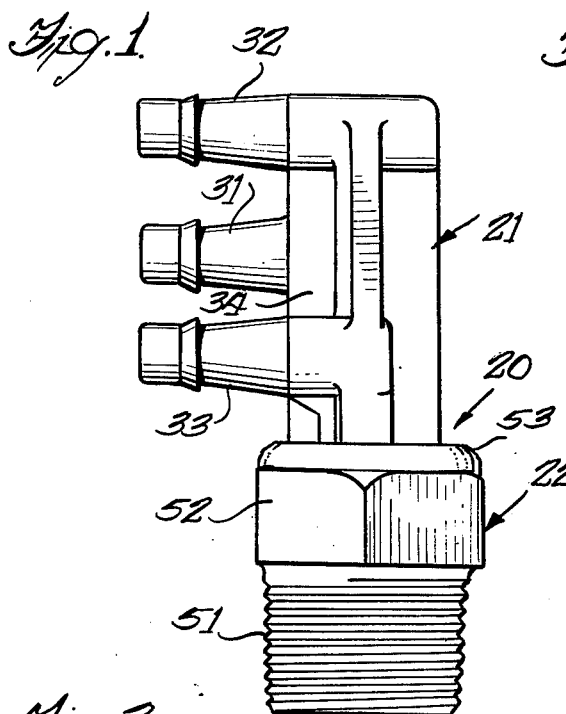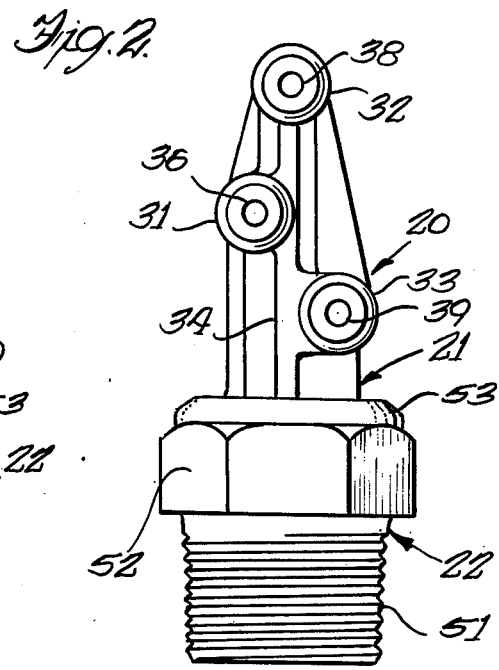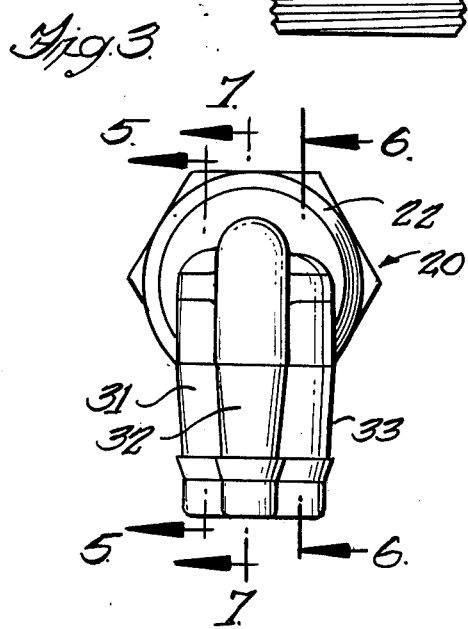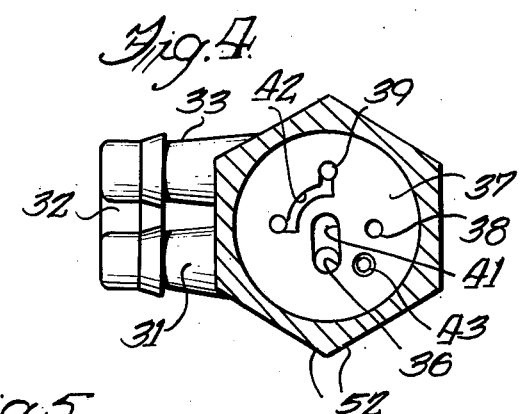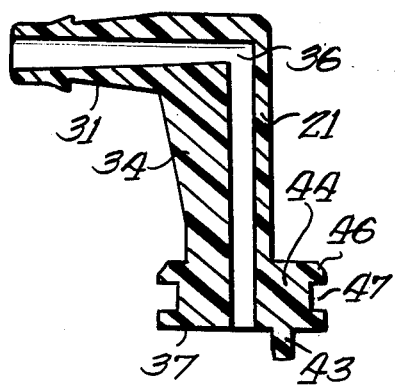

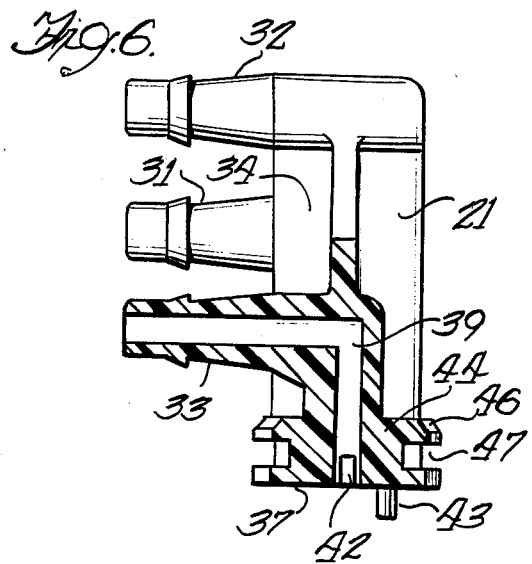
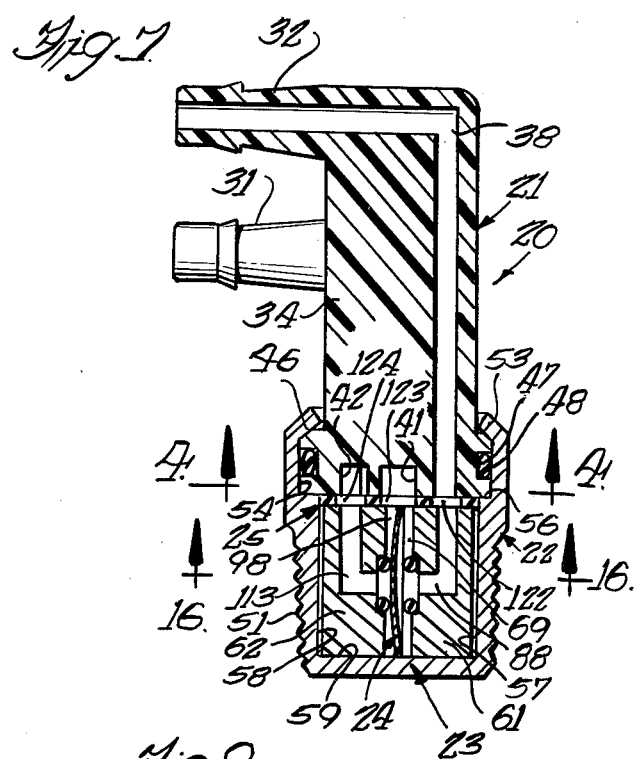
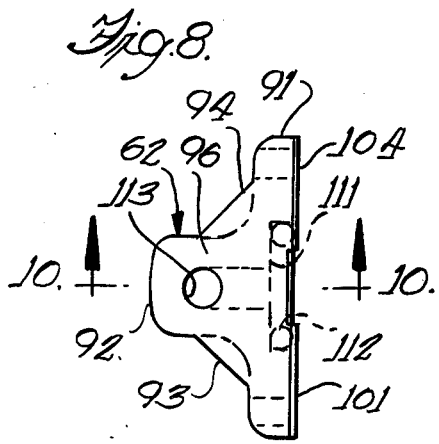
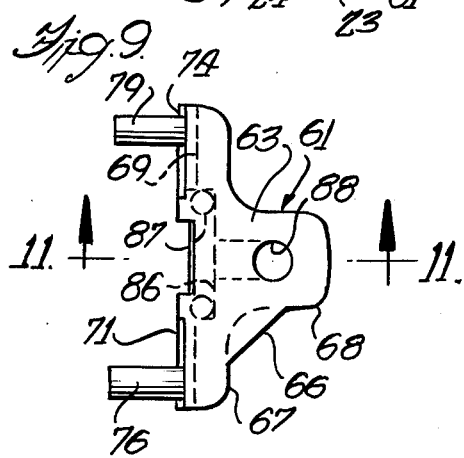
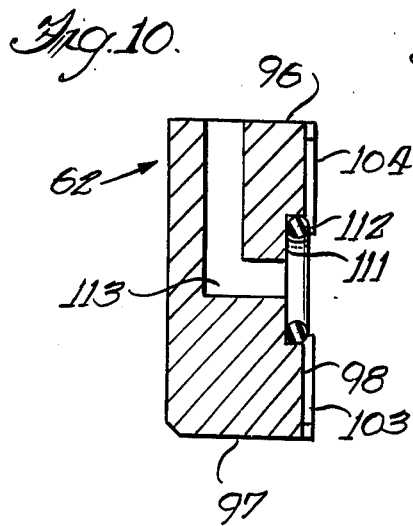
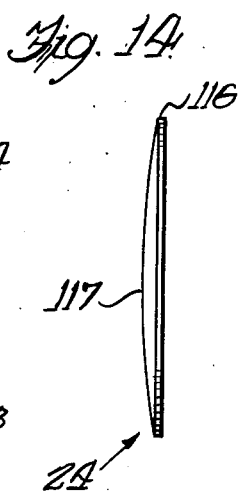
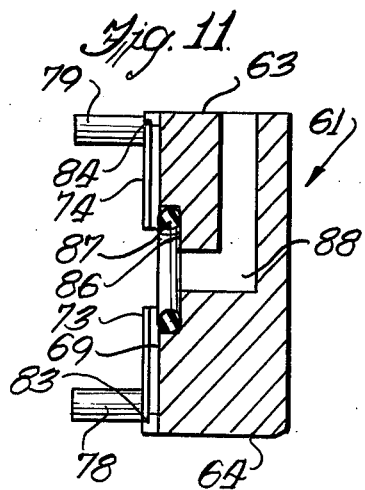

though the line 16—16 of FIG. 7.

THERMALLY ACTUATED VALVE

BACKGROUND OF THE INVENTION

1. Field

The present invention relates to improvements in thermally actuated valves of a type capable of selectively connecting one or the other of a pair of ports with a common port in accordance with temperature.

2. Prior Art

Ported switching valves are known in which a wax pellet type sensor is arranged to extend through a bulkhead for sensing a temperature condition and to operate a plunger which moves a valve element between a pair of seats for selecting a port in accordance with the sensed temperature. Such valves are subject to the objection that the valve element may remain out of contact with both seats for an interval while the pellet material undergoes a change of state. It is known to employ snap action bimetal discs in ported switching valves, however, such discs are often influenced by various temperatures other than the temperature desired to be sensed as a result of its location adjacent other components of the valve assembly which may be heated or cooled by conditions other than the sensed condition.

SUMMARY OF THE INVENTION

The present invention is directed to an improved ported thermal switching valve having a bimetal thermal actuator encased within a thermal cartridge so as to receive substantially equal heating from all sides. The thermal cartridge is maintained in heat transfer relationship with a surface of a member arranged for sensing a selected temperature condition. The structural arrangement of the valve is such as to avoid leakage resulting from unequal thermal expansion and contraction of adjacent members or from repeated cycles of heating and cooling.

BRIEF DESCRIPTION OF DRAWINGS

FIG. 1 is a side view of a thermally actuated switching valve;

FIG. 2 is a front view of the valve shown in FIG. 1;

FIG. 3 is a top view of the valve shown in FIG. 1;

FIG. 4 is a section view of the valve taken along the line 4—4 of FIG. 7;

FIG. 5 is a section view taken along the line 5—5 of FIG. 3;

FIG. 6 is a section view taken along the line 6—6 of FIG. 3;

FIG. 7 is a section view of the valve taken along the line 7—7 of FIG. 3;

FIG. 8 is a top view to enlarged scale of one unit of the thermal cartridge;

FIG. 9 is a top view to enlarged scale of another unit of the thermal cartridge;

FIG. 10 is a section view to enlarged scale of a cartridge unit taken along the line 10—10 of FIG. 8;

FIG. 11 is a section view to enlarged scale of the other cartridge unit taken along the line 11—11 of FIG. 9;

FIG. 14 is an edge view to enlarged scale of a snap action bimetal thermal actuator disc;

DESCRIPTION OF THE PREFERRED EMBODIMENT

Figure 12:
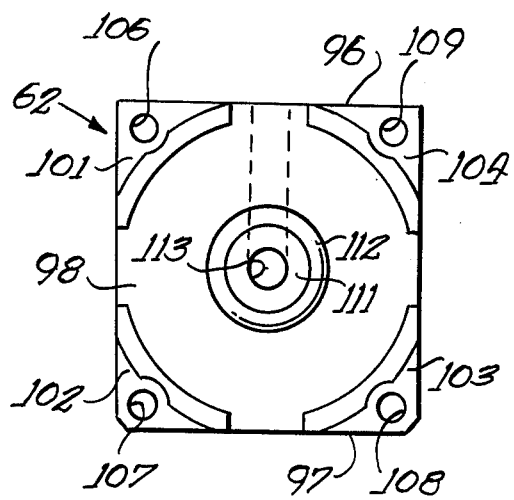
FIG. 12 is a face view to enlarged scale of the cartridge unit shown in FIGS. 8 and 10.
Figure 13:
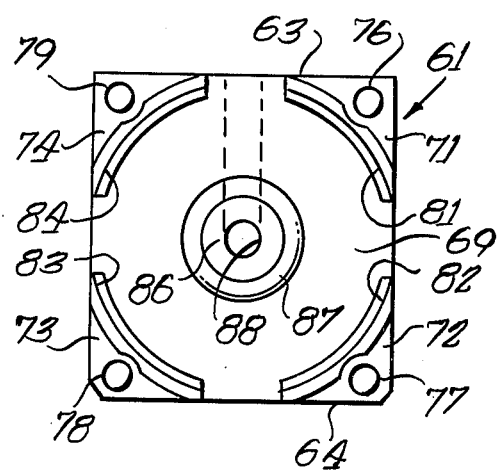
FIG. 13 is a face view to enlarged scale of the other cartridge unit shown in FIGS. 9 and 11.
Figure 15:
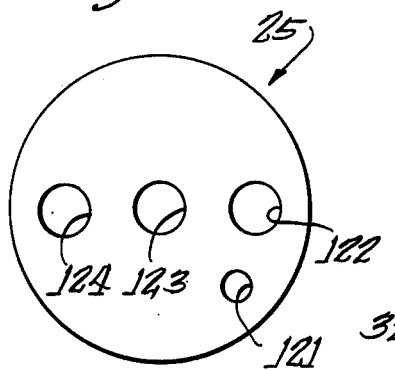
FIG. 15 is a view to enlarged scale of a resilient gasket.

Referring now to the drawings and more particularly to FIGS. 1–7 thereof the thermally actuated valve 20 includes a crown member 21, a cup member 22, a thermally conductive cartridge assembly 23, a thermally responsive valve member 24 and a resilient member 25.

Crown member 21 preferably is formed of a molded heat stabilized synthetic resinous material, and includes a common tube connector 31, and a pair of secondary tube connectors 32, 33 projecting from a body portion 34 thereof. A common passage 36 extends through connector 31 and body portion 34 terminating in surface 37. One secondary passage 38 extends through tube connector 32 and body portion 34 and terminates in surface 37. Another secondary passage 39 extends through tube connector 33 and body portion 34 terminating in surface 37. A groove 41 is formed in surface 37 communicating with common passage 36. A second groove 42 is formed in surface 37 communicating with secondary passage 39. An integral pin 43 projects from surface 37 for aligning cartridge assembly 23 with crown member 21. A collar portion 44 is formed on body portion 34 adjacent surface 37 including an annular chamfer 46 and a groove 47 for receiving an O-ring seal 48.

Cup member 22, preferably is formed of a material having good heat conductive properties such as brass. Cup member 22 is in the form of a modified pipe fitting, having a threaded portion 51 and hexagonal flats 52. The interior of cup member 22 is hollow, defining a lip portion 53, an annulus 54, an annular shoulder 56 and a pocket 57 including a sidewall 58 and a bottom wall 59. The collar portion 44 of crown member 21 is received within annulus 54 with a portion of surface 37 engaging annular shoulder 56. The lip portion 53 of cup member 22 extends from annulus 54 prior to assembly and is thereafter deformed, as by spinning, into engagement with chamfer 46 for securing the cup member 22 and crown member 21 in engagement with each other.

Referring now in more detail to FIGS. 7 through 15, the thermally conductive cartridge assembly 23 includes a pair of similar units 61, 62. Cartridge unit 61 is shown in more detail in FIGS. 9, 11 and 13. Cartridge unit 61 has a top surface 63 engageable with resilient gasket 25, and a bottom surface 64 engageable with bottom wall 59 of cup member 22. As seen in FIG. 9, cartridge unit 61 is generally T-shaped having a web portion 66 on one side joining bar portion 67 with leg portion 68. The front of cartridge unit 61 includes a large recess 69 defining part of a common channel, leaving face portions 71, 72, 73 and 74 in respective corners of the unit. Aligning pins 76, 77, 78 and 79 extend from respective face portions 71, 72, 73 and 74. Annular groove portions 81, 82, 83 and 84 are formed in respective face portions 71, 72 73 and 74 providing a seat for the bimetal snap action disc valve member 24. A smaller recess 86 provides a seat for an O-ring 87. A L-shaped secondary channel 88 intercepts smaller recess 86 and top surface 63 of cartridge unit 61.

Cartridge unit 62 is shown in more detail in FIGS. 8, 10 and 12. Cartridge unit 62 is generally T-shaped as seen in top view in FIG. 8, having a bar portion 91 and leg portion 92 joined by a pair of web portions 93, 94. A top surface 96 is adapted for engagement with gasket member 25 and bottom surface 97 is adapted for engagement with bottom wall 59 of cup member 22. A large recess 98 is formed in cartridge unit 62 defining a portion of a common channel and leaving face portions 101, 102, 103 and 104 defined in the four corners thereof. Apertures 106, 107, 108 and 109 are formed in respective face portions 101, 102, 103 and 104 for receiving aligning pins 76, 77, 78 and 79. A small recess 111 provides a seat for O-ring 112. An L-shaped secondary channel 113 extends between top surface 96 and small recess 111.

Figure 16:
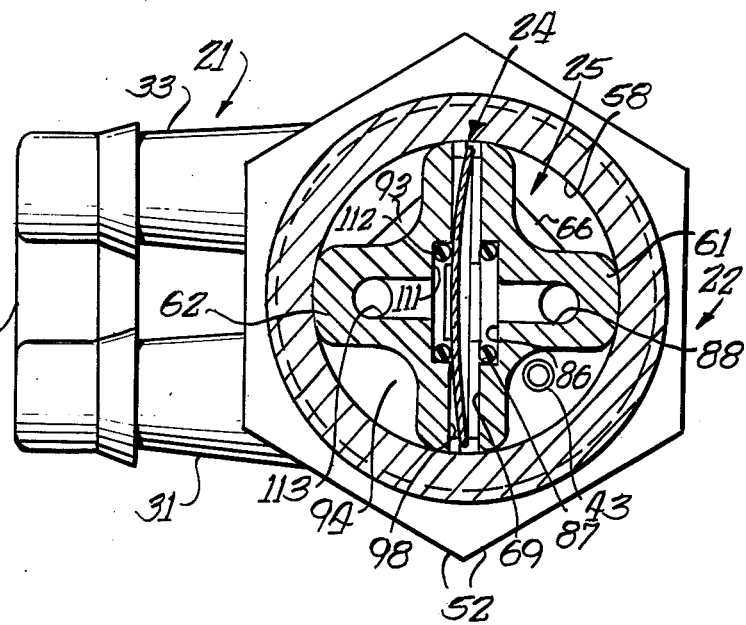
FIG. 16 is a section view to enlarged scale of the valve taken along the line 16—16 of FIG. 7.

As shown more clearly in FIG. 16, the two cartridge units 61 and 62 are brought together in face to face contact encasing the bimetal disc 24 in the common channel formed by the recesses 69 and 98. The three web portions 66, 93 and 94 prevent misalignment of the cartridge 23 with respect to the pin 43 extending from crown member 21.

Preferably, the valve member 24 is a parti-spherical bimetal disc having an edge or rim 116 adapted to engage with the groove portions 81, 82, 83 and 84 of cartridge unit 61. When the disc 24 is seated in cartridge 23, the central portion 117 of the disc engages O-ring 112 below a selected temperature, sealing recess 111 and secondary channel 113 from communication with common channel 69, 98. The other secondary channel 88 communicates with common channel portion 69 through small recess 86 below the selected temperature. When the temperature of disc 24 is above the selected temperature, the central portion 117 thereof flexes in the opposite direction into engagement with O-ring 87. Thus, above the selected temperature, disc 24 permits communication from the common channel to secondary channel 113 while sealing recess 86 and secondary channel 88 form communication with the common channel.

Resilient gasket 25 is formed of a rubber-like material and has a diameter substantially equal to the diameter of pocket 57 in cup member 22. Gasket 25 includes an aperture 121 adapted to receive pin 43 of crown member 21. When gasket 25 is assembled with crown member 21, opening 122 is in alignment with secondary passage 38, opening 123 is in alignment with groove 41 extending from common passage 36, and opening 124 is in alignment with second groove 42 extending from secondary passage 39. When gasket 25 is compressed between crown member 21 and thermal cartridge 23, the opening 123 provides for communication between common channel 69, 98 and common passage 36, the opening 122 provides communication between secondary channel 88 and secondary passage 38, and opening 124 provides communication between secondary channel 113 and secondary passage 39. Thus the openings in the gasket provide communication between the channels in the cartridge and corresponding passages in the crown member. The compression of gasket between cartridge surfaces 63, 96 and crown surface 37 prevents cross leakage between the common and secondary passages and channels. The initial compression of the gasket is determined by the thickness of the gasket, the dimensions of the cartridge and the engagement of surface 37 with annular shoulder 56. The degree of initial compression of gasket 25 is selected both to provide a seal for the channels and passages and to resiliently urge the thermal cartridge toward and maintain same in heat transfer relationship with bottom wall 59 of cup member 22. During operation, the thermal cartridge receives heat from the bottom wall of the cup member, and is likely to expand or contract with respect to the gasket due to differences in thermal expansion of the cup member and cartridge. The resilient character of the gasket, and its location between the cartridge and crown member continue to maintain an effective seal for the channels and passages during such dimensional changes.

Assembly of the valve is initiated by installing O-ring 87 in cartridge unit 61 and O-ring 112 in cartridge unit 62. Disc 24 is placed on unit 61 such that ring 116 engages groove portions 81, 82, 83, and 84 with central portion 117 bowed outwardly. Unit 62 is assembled face to face with unit 61 by means of aligning pins 76, 77, 78, 79 extending into apertures 106, 107, 108, 109. Preferably, the pins are staked or crimped to secure the cartridge units in assembly. The disc 24 is thus encased within the cartridge. O-ring 48 is placed in groove 47 of crown member 21. The gasket 25 is placed on surface 37 of crown member 21 with pin 43 extending through aperture 121, such that openings 122, 123, 124 communicate with corresponding passages in the crown member. The cartridge and disc sub-assembly is placed on the gasket with pin 43 extending between the un-webbed bar and leg of unit 61 thus placing the common and secondary channels of the cartridge in communication with corresponding common and secondary passages of the crown member through openings 122, 123, 124 in gasket 25. The cartridge, gasket and crown members are inserted in cup member 22 with surface 37 engaging shoulder 56 and the lip portion 53 is then deformed into engagement with chamfer 46 for retaining the various components of the valve in assembled relationship.

While valves as described above are useful for many purposes, an example of the use of two such valves for controlling the low and high operating temperatures of an internal combustion engine are described hereinafter. In such example, both the low temperature and high temperature valves have the cup member threaded into the water jacket of an engine such that the bottom of the cup senses the temperature of the engine coolant. The temperature of the coolant is transmitted through the cup to the cartridge and disc. The disc of the low temperature valve is selected to snap over at a temperature corresponding to the minimum desired operating temperature of the engine, and the disc of the high temperature valve is selected to snap over at the maximum desired operating temperature of the engine.

The low temperature valve has its common connector 31 connected to the EGR port of a carburetor while its upper connector 32 is connected to a distributor spark advance mechanism through a check valve. The lower connector 33 of the low temperature valve is connected to an EGR (Exhaust Gas Recirculation) system. When the engine is started cold, the vacuum developed in the EGR port is ducted through the common connector 31 to upper connector 32 and the spark advance mechanism for increasing idle speed of the engine during warm up. As soon as the engine reaches its minimum desired operating temperature, the disc snaps over center such that the vacuum developed in the EGR port is ducted through common connector 31 and lower connector 33 for operation of the EGR system.

The high temperature valve has its common connector 31 connected to the spark advance mechanism while its upper connector 32 is connected to the spark port of the carburetor and its lower connector 33 is connected to intake mainfold vacuum. During normal engine operation, the vacuum developed in the spark port is ducted through upper connector 32 to common connector 31 and to the spark advance mechanism. If the engine should overheat, such as during an extended period of idle speed operation, the disc will snap over center at the maximum desired operating temperature of the engine. When the high temperature valve snaps over center, manifold vacuum is ducted through lower connector 33 to common connector 31 and the spark advance mechanism for increasing the idle speed of the engine to bring about increased circulation of the coolant.

A preferred embodiment of an improved thermally actuated valve has been described above and is claimed in the following claims.

What is claimed is:

1. A thermally actuated valve comprising:
   a cup member including a pocket defining a bottom wall and a side wall having an annular shoulder spaced from said bottom wall, said cup member being adapted for contact with a heat source;
   a thermally conductive cartridge received within said pocket having a bottom surface engaging said bottom wall of said pocket, said cartridge including a centrally disposed common channel communicable with a pair of secondary channels disposed on opposite sides of said common channel, each of said common and secondary channels opening through an upper surface of said cartridge;
   a thermally responsive bimetal snap action valve member disposed in said common channel having a portion movable from sealing engagement with one of said secondary channels into sealing engagement with the other of said secondary channels for controlling communication between said common channel and said secondary channels in accordance with temperature change in said cartridge;
   a resilient gasket disposed in said pocket overlying said upper surface of said cartridge including a pattern of openings communicating with said common and secondary channels;
   a crown member including a common passage and a pair of secondary passages opening through a lower surface thereof communicating with said pattern of openings in said gasket, said lower surface having portions engaging said gasket and said annular shoulder of said cup member; and
   means securing said crown member to said cup member whereby said gasket is compressed between said upper surface of said cartridge and said lower surface of said crown members for resiliently urging said cartridge into heat transfer engagement with said bottom wall of said cup member while maintaining a seal around said channel and passage openings.

2. A thermally actuated valve according to claim 1, wherein said thermally conductive cartridge includes a pair of units arranged for face to face engagement with each other, each of said units including a respective one of said secondary channels, respective faces of said units including recesses defining respective portions of said common channel.

3. A thermally actuated valve according to claim 2, wherein said cartridge includes means for aligning said units in a predetermined face to face relationship.

4. A thermally actuated valve according to claim 2, wherein respective faces of said units include means for mounting said thermally responsive valve member.

5. A thermally actuated valve according to claim 4, wherein said means for mounting said thermally responsive valve member comprises a substantially annular groove, said thermally responsive valve member including a bimetal disc having its perimeter engaged with said annular groove.

6. A thermally actuated valve according to claim 5, wherein respective of said secondary channels communicates with said common channel adjacent opposite faces of said bimetal disc, a central portion of said bimetal disc being deflectible from sealing engagement with one of said secondary channels into sealing engagement with the other of said secondary channels in response to a selected temperature change in said cartridge.

* * * * *